(12) United States Patent
Borac

(10) Patent No.: US 8,898,794 B1
(45) Date of Patent: Nov. 25, 2014

(54) EFFICIENT AND SECURE DATA STRUCTURE SYNCHRONIZATION

(76) Inventor: Andrei Teodor Borac, Pacifica, CA (US)

(*) Notice: Subject to any disclaimer, the term of this patent is extended or adjusted under 35 U.S.C. 154(b) by 19 days.

(21) Appl. No.: 13/199,674

(22) Filed: Sep. 6, 2011

(51) Int. Cl.
*G06F 21/00* (2013.01)

(52) U.S. Cl.
USPC ............... 726/26; 726/12; 717/128; 717/136; 717/148; 717/150; 718/100; 718/103

(58) Field of Classification Search
CPC ....................................................... G06F 9/526
USPC .................... 726/26; 711/118, 150, 152, 163; 717/119, 124, 128
See application file for complete search history.

(56) References Cited

U.S. PATENT DOCUMENTS

| | | | |
|---|---|---|---|
| 6,247,025 B1 | 6/2001 | Bacon | |
| 6,330,709 B1 * | 12/2001 | Johnson et al. | 717/100 |
| 6,546,443 B1 | 4/2003 | Kakivaya et al. | |
| 6,618,824 B1 | 9/2003 | Hastings | |
| 7,089,544 B2 * | 8/2006 | Hickson | 717/148 |
| 7,516,446 B2 | 4/2009 | Choi et al. | |
| 8,032,706 B2 | 10/2011 | Zheltov et al. | |
| 8,176,491 B1 * | 5/2012 | Plummer et al. | 718/100 |
| 2002/0138706 A1 | 9/2002 | Hugly | |
| 2010/0275191 A1 * | 10/2010 | Duffy et al. | 717/150 |
| 2011/0246727 A1 * | 10/2011 | Dice et al. | 711/150 |

OTHER PUBLICATIONS

Java Compatibility Kit 6b User's Guide; Sun microsystems, Aug. 2008.*
Arora, N. S., et al., "Thread Scheduling for Multiprogrammed Multiprocessors," Proceedings of the 10th Annual ACM Symposium on Parallel Algorithms and Architectures, pp. 119-129, ACM Press, New York, NY, 1998.*
Bloch, Joshua, Effective Java, Sep. 2004, pp. 63, 122-125, Addison Westly, Boston MA, USA.
Erich Gamma, Richard Helm, Ralph Johnson and John Vlissides, Design Patterns (Elements of Reusable Object-Oriented Software), Nov. 10 1994, pp. 207-217, Addison-Wesley Longman, Inc, Reading, Massachusetts, USA.

* cited by examiner

*Primary Examiner* — Jason Lee

(57) ABSTRACT

One embodiment of a computer-implemented data structure synchronization mechanism comprises an interface for accessing a data structure and storing ownership data in a shared memory location. The method further comprises denying write operations if the thread attempting the write operation is not designated as the owner thread by said ownership data. The method further comprises denying requests to modify the ownership data if the thread making the request is not designated as the owner thread by said ownership data. The method further comprises effecting a write fence in the context of the thread making the request to modify ownership data prior to modifying the ownership data. Other embodiments are described.

10 Claims, 7 Drawing Sheets

EFFICIENT AND SECURE DATA STRUCTURE SYNCHRONIZATION

CROSS-REFERENCE TO RELATED APPLICATIONS

Not Applicable

FEDERALLY SPONSORED RESEARCH

Not Applicable

BACKGROUND

1. Field

This application relates to synchronization mechanisms, specifically to such synchronization mechanisms which are used to prevent concurrent modification of data structures in shared-memory multi-threaded execution environments.

2. Prior Art

For correct operation, programs written for execution in multi-threaded environments must typically ensure that no data structure is simultaneously read and written by different threads. Usually, a fragment of a computer program (also known as a "critical section") that performs a calculation over the contents of the data structure operates under the assumption that the contents of the data structure do not change while the critical section is executing (these assumptions are made by the programmer as he or she is writing the code). In general, it is not desirable to eliminate these assumptions as it would greatly increase the complexity of the program if it had to correctly account for concurrent modification of the data structure. Therefore, to prevent concurrent modification, it is necessary to "synchronize" the execution of the critical section with all critical sections that may modify the data structure.

A reader-writer lock is a typical synchronization mechanism known in the prior art. Proper use of a reader-writer lock ensures that the execution of a critical section that writes to the data structure does not overlap with the execution of any critical section that accesses (reads from or writes to) the data structure (including the same critical section executing in a different thread). Each time a thread begins execution of a critical section that accesses the data structure, the reader-writer lock must be "acquired", for the thread to obtain either a read-lock or a write-lock. During lock acquisition, the reader-writer lock implementation is given the opportunity to stall execution of the thread until a "competing" thread releases a lock (if the reader-writer lock determines a conflict).

Towards the end of writing secure systems, it is desirable to separate programs and program code into various "trust domains" and engineer the implementation of each trust domain not to rely on the correct operation of other trust domains, especially those trust domains containing more complex code or those trust domains directly manipulating data that may have originated an untrusted source (such as an Internet connection).

For example, it is sometimes desirable to separate program code into two trust domains of privileged code and unprivileged code (such large subprograms are also known as "modules"). Frequently, unprivileged code runs in a "security context" in which many systems-related operations (such as disk access or read and writing to files) are disallowed in order to minimize the possible harm due to programming errors (i.e., "bugs") in the unprivileged code. Ideally, the unprivileged code may perform computations only, with no direct access to shared resources through which sensitive data may pass (such resources might include, for example, filesystems and network interfaces). Usually, the unprivileged code must still have indirect access to shared resources; nevertheless, a security benefit exists if it can be enforced that such access is subject to validation by separate "supervisor" code (supervisor code forms a part of the aggregate privileged code).

Ideally, the security of a whole program utilizing the technique of privilege separation is guaranteed as long as the supervisor code validates only those accesses to shared resources that are in accordance with the program's security policy (an addition to the obvious requirement that the remaining privileged code has no exploitable security holes). Software systems that run privileged and unprivileged code in separate security contexts are said to employ "privilege separation". A notable example of such a system is the GNU/Linux operating system, in which the kernel code is considered privileged and allowed direct access to hardware resources and application code is considered unprivileged and is not allowed direct access to hardware resources. Application code negotiates access to (virtualized) hardware resources through a "privilege barrier". Privilege separation is of tremendous practical importance because it allows more efficient allocation of developer effort—the high standards required for the development of security-critical software need be applied only to the privileged code. Proper use of the privilege privilege separation technique results in security and productivity benefits.

Concurrent modification of data structures is a large security risk for systems employing privilege barriers, privilege separation or trust domains. Suppose a less-privileged thread writes a username and password into a memory region and submits a request to a more-privileged thread for the unprivileged thread to be granted access to the named user's files. The code for the privileged thread may be written to first check that the password is correct for that username and then add the username to a list of accounts that the unprivileged thread may request file access for in the future. Security is broken if the username is modified at some point between these two operations—the password was verified to match for the first username, but access was actually granted for the second username for which a password was not supplied. The modification might be made by the same unprivileged thread the made the request or by a different unprivileged thread having access to the data structure containing the username. If an attacker can trick the code of an unprivileged thread into making such a concurrent modification (for example, by manipulating data supplied to the unprivileged code through an Internet connection), then the attacker can access the files of any other user without supplying the password.

While the untrusted code for the unprivileged thread should almost certainly be fixed, the whole point of privilege separation is that security should be guaranteed even if such flaws are present in untrusted code. Therefore concurrent modification across a privilege barrier is a problem with the privilege barrier.

The following two solutions to the problem of concurrent modification across a privilege barrier or trust domain are known in the prior art. The first solution, known as "defensive copy", is for the privileged code to make a copy of the data supplied by the unprivileged code and work with that copy only. The unprivileged code has no access to data structures created privately by the privileged code, so concurrent modification is not possible. The second solution is for the privileged code to suspend all threads that are running unprivileged code that may have access to the data being passed across the privilege barrier. A suspended thread does not execute code while it is suspended and hence cannot modify memory. After the privileged code has finished processing, it resumes the previously suspended threads.

In a memory-safe execution environment, it is ensured that even maliciously-written code cannot defy a number of basic semantics of the execution environment's supported language(s), which are frequently sufficiently strong that privilege barriers can be implemented using the constructs provided by the language itself (as opposed to methodology prior to memory-safe execution environments, in which operating system kernels used processor-specific hardware support to manage security contexts and privilege barriers). The term "memory-safety" refers to the important guarantee that arrays and other data structures cannot be accessed "out of bounds" to reach otherwise unreachable memory. In execution environments without memory safety, any memory location can usually be read or written by any thread (unless page-level access protection is used, but page-level access protection is an extremely cumbersome mechanism to employ). In many memory-safe execution environments, unprivileged (or, at least, less-privileged) security contexts can be created and assigned to threads programatically. In Java, this can be achieved, for example, by using the SecurityManager API. This allows the implementation of application-specific privilege separation mechanisms, with the security and productivity benefits previously described. Note that Java, and all Java-based trademarks and logos are trademarks or registered trademarks of Oracle and/or its affiliates. Examples are given with reference to the specifics of Java for concreteness, but it is to be understood that similar facilities may be available in other memory-safe execution environments.

However, the concurrent update problem is not completely solved by the use of type-safe and/or memory-safe execution environments because most such environments support full concurrency. Concurrency can easily be disabled (simply do not create any threads), but this also negates performance advantages available on multi-processor machines. In the prior art, the widely recommended solution for the concurrent update problem remains defensive copying. In Java, the copy can be performed in advance, as soon as the final value of a data structure has been calculated. The container for such a "copy made in advance" is called an immutable wrapper class. For example, the String class in Java accepts a character array as one possible way to construct a String object. The constructor of String makes a copy of the character array and stores the copy in a private field.

By not providing any method that can modify the private character array (or, worse, return the reference of the private character array), the String class ensures ensured that the copy cannot be modified by any thread (hence "immutable"). Therefore, privileged code can process String objects generated by unprivileged code without a security risk due to concurrent update. Since this depends on proper behavior of the String class, the String class is said to be "trusted" and forms part of the aggregate privileged code and must be reviewed critically along with all privileged code). It is important to note that copying has not been avoided by using the String class—it has simply been performed at a different point in the execution of the program. On top of the performance degradation due to copying, attempting to apply the model of immutability in general can result in large "bloated" programs (i.e., programs that have an excessive amount of code) due to the requirement of having a mutable and immutable variant of every data structure. An excessive amount of code can result in poor run-time performance as well complicating the software development process.

A commonly-used alternative to copying is locking (which is also termed "synchronization"). As mentioned previously, a reader-writer lock allows simultaneous access to the object by either exactly one writer or any number of readers. In the context of privilege separation mechanisms, a privileged thread can acquire a read-lock on the data structure and be assured that no other thread can modify the data structure until the privileged thread releases its read-lock. However, when this must be implemented as a security mechanism (i.e., a "mandatory" security policy rather than a cooperative strategy for correct multi-threading), the unprivileged code must be prevented from being allowed to modify the data structure without holding a write-lock.

This can be achieved by creating a logical "encapsulation" of the data structure (or "interface" to the data structure) which acts as a proxy for read and write operations on the data structure. Read and write operations can only be effected through the trusted proxy, which acquires and releases the appropriate type of lock for the operation. Such encapsulations are known in the prior art (for example, the "Collections.synchronizedCollection" facility in Java).

Direct combination of an encapsulation with a prior art synchronization mechanism is highly inefficient as locking must be performed around each read or write request. The cost of locking can greatly exceed the cost of a unitary read or write operation. The high locking overhead results in severe performance degradation, which is why, historically, copying has been perceived as the preferable solution. While locking over longer sequences of operations is possible, and has been used extensively in the prior art (for example, a "synchronized" block in the Java programming language), it cannot be used as a security mechanism, since the unprivileged code cannot be trusted to correctly perform locking.

Some synchronization mechanisms known in the prior art, in particular the "recursive mutex" operate in part by storing a thread identifier to identify threads, a technique that is also used in the present invention. However, prior-art synchronization mechanisms also require a memory fence on each acquisition or release of the lock, which is the main cause of the aforementioned "locking" overhead. This overhead precludes direct combination of a data structure encapsulation with a prior-art synchronization mechanism unless performance degradation is acceptable (measurements in contemporary Java environments show an approximately ten-fold reduction in performance).

Traditionally, the overhead of locking has been avoided by locking over longer sequences of operations, and this technique is used extensively in the prior art. For example, a "synchronized" block in the Java programming language acquires and holds a lock while executing the entire contents of an code block, which may effect an unlimited number of unitary modification operations. However, this technique cannot be used in security-critical systems, since the unprivileged code cannot be trusted to correctly perform locking.

In view of the foregoing, there is a need for improved data structure synchronization mechanisms.

SUMMARY OF THE INVENTION

In accordance with one embodiment a computer-implemented method for detecting and preventing potentially harmful concurrent modification of a data structure accessed by multiple threads comprises an interface for accessing a data structure and storing ownership data in a shared memory location. The method further comprises denying write operations if the thread attempting the write operation is not designated as the owner thread by said ownership data. The method further comprises denying requests to modify the ownership data if the thread making the request is not designated as the owner thread by said ownership data. The method further comprises effecting a write fence in the context of the thread making the request to modify ownership data prior to modifying the ownership data.

BRIEF DESCRIPTION OF THE DRAWINGS

The present invention will be readily understood by the following detailed description in conjunction with the accompanying drawing, wherein like reference numerals designate like structural elements, and in which.

DETAILED DESCRIPTION OF THE INVENTION

Figure 1:
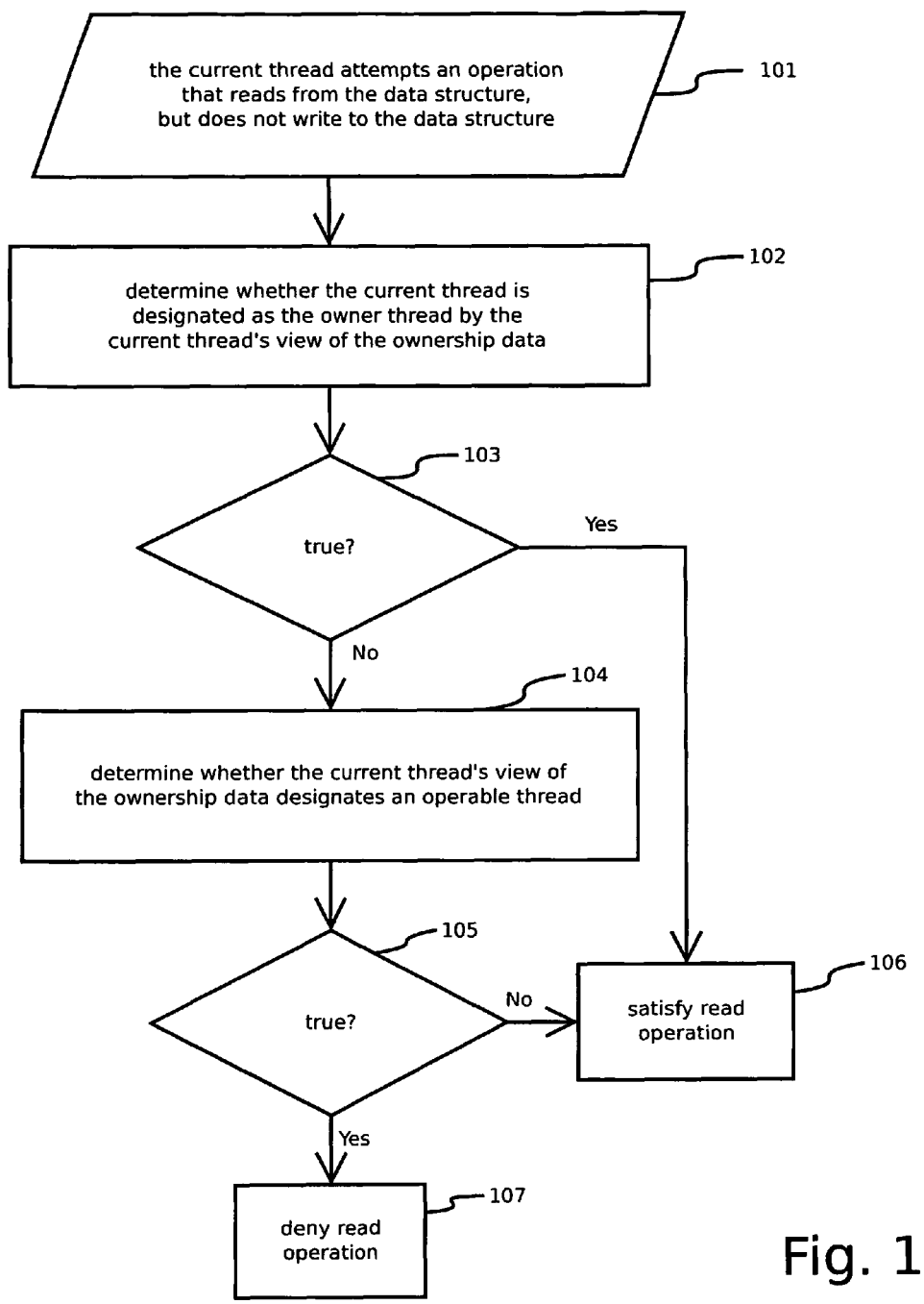
FIG. 1 contains a flowchart detailing conditions that must be checked before a read operation is allowed in accordance with the first embodiment.

As noted in the background of the invention, there is a need for improved data structure synchronization mechanisms. Accordingly, the present invention, when implemented correctly, achieves mandatory concurrent access protection with greatly reduced run-time overhead and reduced program complexity. Reduced program complexity is useful in that it lowers the development costs of computer programs.

In accordance with the first embodiment, a memory-safe execution environment is configured with an interface for accessing a data structure. The interface may be employed by trusted and/or untrusted code to access (read or write values from and to) the data structure. A memory-safe execution environment is the combination of CPU and memory hardware with an interpreted or compiled or dynamically-compiled language that has the property of routinely enforcing memory safety. A language enforces memory safety when it detects and prevents stray memory accesses (such as would be caused by an array index out of bounds), so that isolation of computer program components may be achieved. Java is an example of a memory-safe language known in the prior art, and the Java Virtual Machine executing on a CPU with attached system memory is an example of a memory-safe execution environment known in the prior art.

In accordance with the first embodiment, the interface to the data structure comprises a class structure comprising proxy functions (alternatively termed "access functions") for reading from and writing to the data structure, or performing operations that read from and write to the data structure. These functions "intercept" the respective operations so that access checks may be performed and the operations may be denied.

Those skilled in the art will appreciate that the present invention is not limited to any particular type of data structure; rather, it specifies a general mechanism for ensuring proper access synchronization independently of the type of data structure being accessed. Those skilled in the art will further appreciate that the present invention is not limited to a class structure for implementing the interface to the data structure; rather, the most convenient encapsulation means provided by the programming language in use may be employed.

By way of example only, supposing that the data structure is a table, the encapsulation of, and interface to, the table may contain an access function to read the element at an index location and an access function to write an element to an index location, with the expected functionality that the element resulting from reading at an index location be the element most recently written to that index location. If the index is a non-negative integer, encapsulation of an array is achieved. If the element type of an array is a character, encapsulation of a string is achieved. If the index is of a more complex type, or of a compound type, encapsulation of a "map" is achieved, which may be implemented as a tree or a hash table. If the element type of a map is a boolean, encapsulation of a "set" is achieved.

In accordance with the first embodiment, access functions are augmented with "access checks;" in particular, access functions that read from, but cannot ever possibly write to, the data structure are augmented with a "read access check" while access functions that may possibly write to the data structure are augmented with a "write access check". Augmentation of an access function with an access check means, specifying, to the execution environment, that the effect of the access check should be ensured before proceeding with execution of the access function. In most execution environments, this augmentation is most conveniently achieved made by placing "if" statements at the top of each access function. The condition of the "if" statements may be such that they evaluate to true when the access is to be denied, and the body of the "if" statements may be expressions that would preclude further execution of the access function, such as "return false" or "throw null". Alternatively, the entire contents of the access function may be placed in the body of an "if" statement and the condition of the "if" statement may be such that it evaluates to true when the access is to be allowed. Many other equivalent possibilities exist.

In accordance with the first embodiment, the encapsulation further comprises "ownership data". The ownership data may be in the form of a cacheable variable called the "owner thread". The owner thread variable is located in a shared memory (it occupies a shared memory location), and can store either the identifier of a thread that is presently granted exclusive access to the data structure, or a distinguished "frozen" value indicating that the data structure is in the "frozen" state. Most execution environments provide a "null" value that can be conveniently used as the distinguished "frozen" value; where this facility is lacking an "inoperable" thread may be created and its thread identifier used as the distinguished value. The inoperable thread, should, of course, execute code formulated to not ever modify any data structure, such as, for example, a loop to "sleep" or "wait" for long periods of time indefinitely. In all cases, the ownership data either designates a specific operable thread as the owner thread or does not designate any operable thread as the owner thread. Many other equivalent possibilities exist for arranging ownership data and choosing a distinguished "frozen" value.

In most shared-memory environments, each executing thread has a different "view" of the memory. Such memory views are usually not guaranteed to be consistent (i.e., not always equivalent to any serial execution order of individual instructions), in order to allow optimizations in the processor, memory system, and of the program code by the compiler. In conventional execution environments, partial consistency can be enforced through memory fences. However, inclusion of memory fences in frequent code paths can greatly decrease performance as they preclude many compiler optimizations.

It is an important advantage of the present invention that the access checks are formulated not to require any memory fence, and can be performed using "cacheable" loads of the stored thread identifier, whereby the access check code can be the target of compiler optimizations, including the "pulling" of access checks out of a loop, so that the access checks are performed only once before entering the loop rather than at each iteration (in execution environments which provide the appropriate optimizations). This is what is meant by the owner thread variable being "cacheable". Therefore, "volatile" (or an equivalent modifier that would specify a memory fence on every access of the variable) need not be used on the declaration of the thread identifier variable as it is not necessary when correctly implementing the synchronization protocol described herein, and partially negates the performance benefits of its use. Memory fences need only be selectively included in the specific places described.

Multi-threaded execution environments must provide memory fence mechanisms to allow proper synchronization. Sometimes these fences are called "barriers". Regardless of the naming convention used by execution environment, fences can be recognized by their behavior. A "write fence" ensures that all write operations issued before the write fence in program execution order become visible to other threads before any write operation issued after the write fence in program execution order. A "read fence" ensures that no read operation issued after the read fence in program order uses a cached value previously read from memory before the read fence in program order.

In the Java Virtual Machine, a write fence may be effected by writing to a volatile variable while a matching read fence may be effected by reading from the same volatile variable. In accordance with the first embodiment, a static volatile integer variable is used for the purpose of effecting memory fences, but it will be readily apparent to those skilled in the art that many other combinations for effecting memory fences are possible, and it will be appreciated that the present invention is not limited to any one. For example, releasing an object monitor is equivalent to issuing a write fence, so a write fence can be effected by an empty synchronized block on a shared object (in fact, a combination of both a read fence and a write fence is effected in this case).

An important part of the present invention concerns providing read repeatability. Read access to a data structure is "repeatable" from the perspective of a given thread if, over an interval of program execution, the result of read operations is as if no other thread were modifying the data structure during that interval (that is, concurrent access is prevented). The end of the interval can be open (for example, when the data structure is determined to be "frozen", in which case read repeatability is ensured for the entire future of program execution).

In accordance with the first embodiment, a read access check (FIG. 1) is performed when a thread attempts an operation that reads from the data structure, but that operation does not write to the data structure (101). The read access check is performed in the context of the thread that is attempting to effect the read operation, which is consequently the "current thread", and whose thread identifier is readily obtained from the execution environment. The owner thread variable (as viewed from the current thread without a memory fence), is then compared with the thread identifier of the current thread to determine whether the current thread is designated as the owner thread by the ownership data (102). If the comparison/determination is true (103), the read operation is satisfied (106). Otherwise, the owner thread variable is compared to the distinguished "frozen" value to determine whether the ownership data designates an operable thread (104). If the comparison/determination is true (105), the read operation is allowed and may be satisfied (106); otherwise, it is denied (107).

Figure 2:
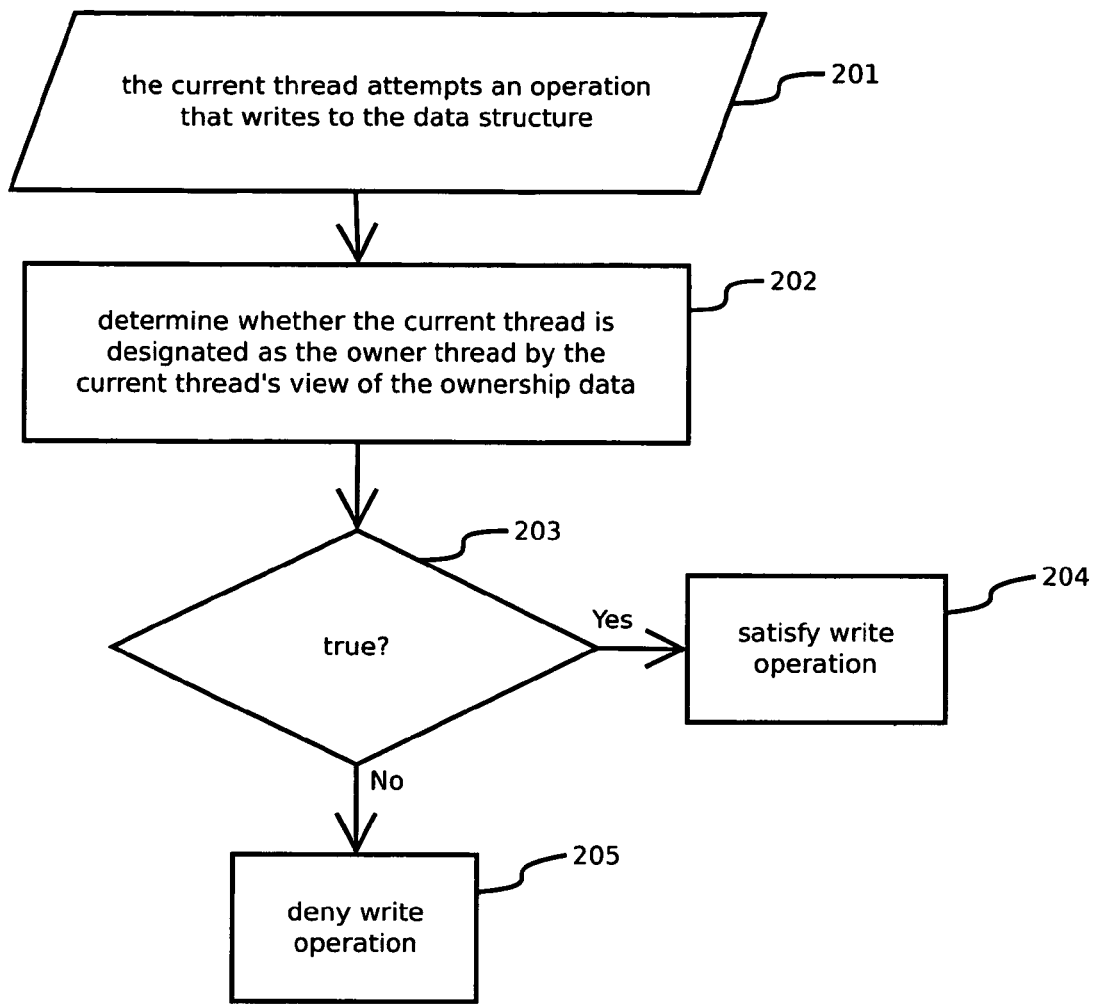
FIG. 2 contains a flowchart detailing conditions that must be checked before a write operation is allowed in accordance with the first embodiment.

In accordance with the first embodiment, a write access check (FIG. 2) is performed when a thread attempts an operation that writes to the data structure (201). As in the case of the read access check, the thread identifier of the current thread is readily available for comparison with the owner thread variable (as viewed from the current thread without a memory read fence) to determine whether the current thread is designated as the owner thread by the ownership data (202). If the comparison/determination is equal/true (203), the write operation is allowed may be satisfied (204); otherwise it is denied (205).

Figure 3:
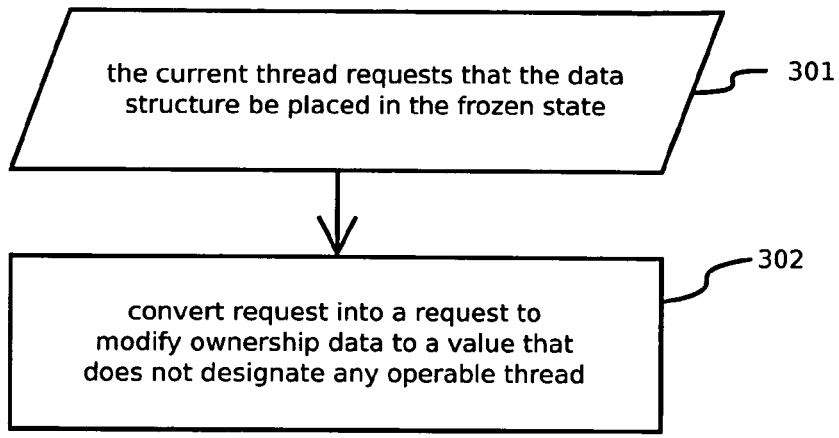
FIG. 3 contains a flowchart detailing operations that may be performed to effect a "freeze" operation in accordance with the first embodiment.

In accordance with the first embodiment, a request that the data structure be placed in the frozen state (FIG. 3) is handled (301) in the same manner as (by "conversion" to) a request to modify ownership data to a value that does not designate any operable thread (302).

Figure 4:
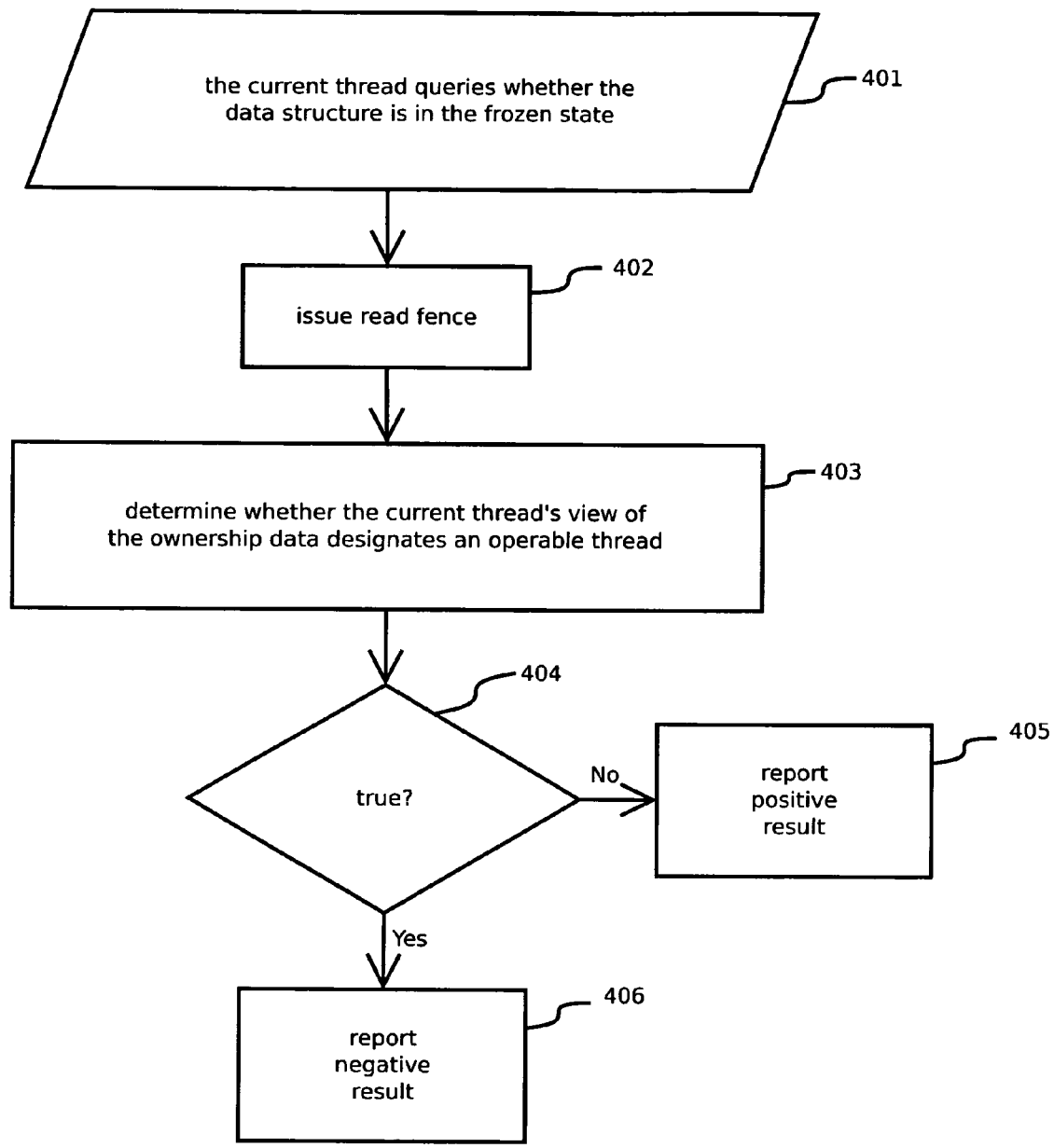
FIG. 4 contains a flowchart detailing a procedure by which it can be determined whether the data structure has been frozen or not in accordance with the first embodiment.

In accordance with the first embodiment, a query of whether the data structure is in the frozen state (FIG. 4) is handled (401) as follows. After issuing a read fence (402), the owner thread variable is compared with the distinguished "frozen" value to determine whether the ownership data designates an operable thread (403). If the comparison/determination is equal/true (404), a positive result is reported (405), indicating to the part of the program performing the query that the data structure is indeed frozen, and that subsequent read operations will be repeatable. Otherwise, a negative result is reported (406). The purpose of the read fence (402) is to obtain the most up-to-date value of the owner thread variable from the memory system, and to prevent reuse of previously-cached portions of the data structure contents, since they may be invalid if the data structure was only recently placed in the frozen state.

Figure 5:
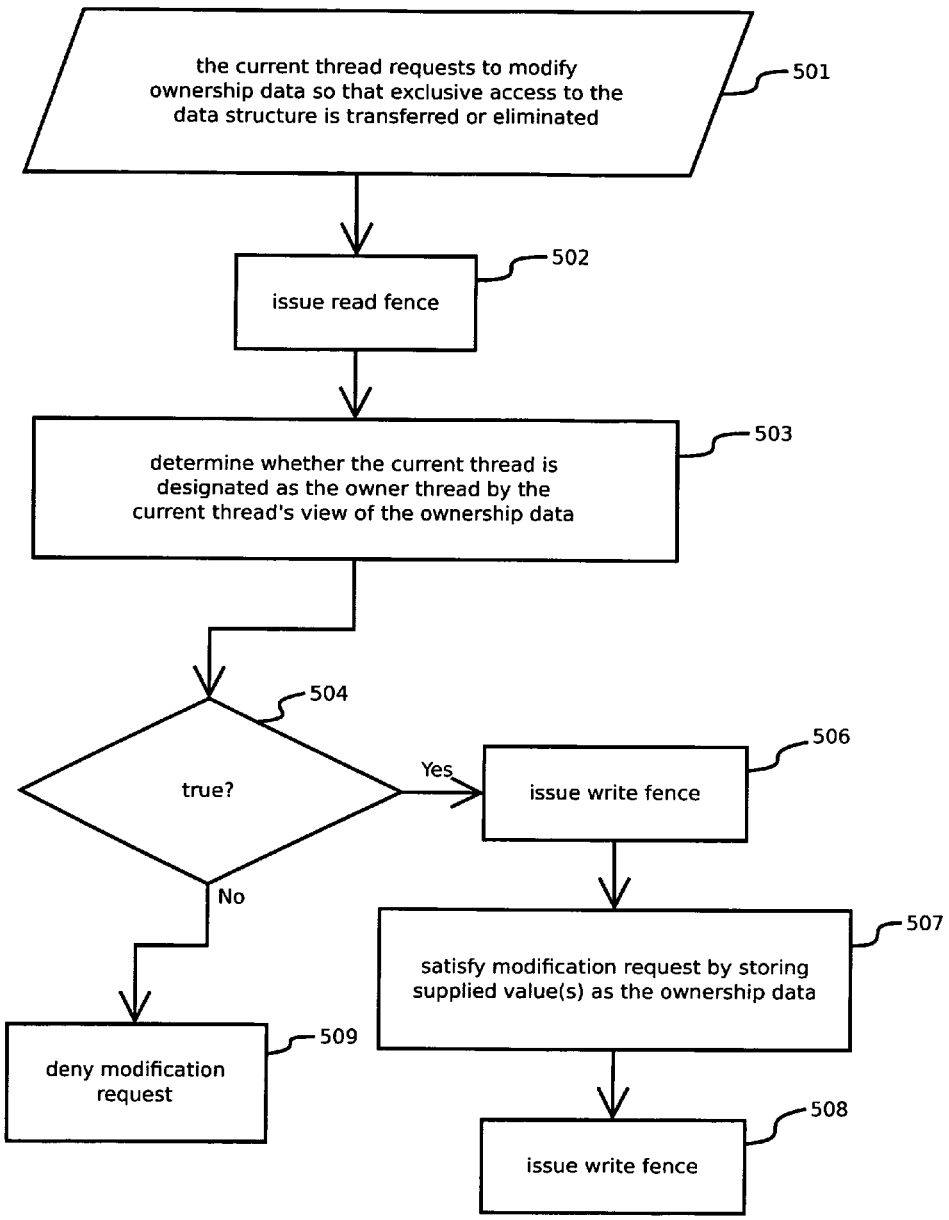
FIG. 5 contains a flowchart detailing the conditions that must be checked before a transfer operation is allowed and a procedure by which the transfer operation may be effected in accordance with the first embodiment.

In accordance with the first embodiment, a request to modify ownership data so that exclusive access to the data structure is transferred or eliminated (FIG. 5) is handled (501) as follows. After issuing a read fence (502), the owner thread variable is compared with the thread identifier of the current thread to determine whether the current thread is designated as the owner thread by the ownership data (503). If the comparison/determination is not equal/true (504), the transfer request is denied. If the comparison/determination is equal/true (504), a write fence is issued (506) and the transfer operation is satisfied by storing a supplied thread identifier in the owner thread variable as ownership data (507) and another write fence is issued (508).

The purpose of the first write fence (506) is to order writes, ensuring that the current thread's changes to the data structure (if any) are made visible to the thread that the data structure is being transferred to before the transfer itself is made visible to that thread. Since the reverse memory write order would violate the read repeatability expected when observing the data structure as owned by the current thread from the point of view of the thread that the data structure is being transferred to, the write fence (506) is critical.

The purpose of the second write fence (508) is to ensure that the ownership modification (507) is made visible to other threads in the near future (rather than allowing the write to be delayed, perhaps until after a long loop finishes executing). Since this is a very minor concern that only manifests in very poorly architected programs (in which, for example, another thread is using the discouraged technique of "polling" for the data structure to be placed in the frozen state), the second write fence (508) can be eliminated entirely in most programs. In execution environments that have a separate write flush mechanism, the second write fence (508) may be replaced with a write flush, in order to more directly achieve the intended result. While a delayed write may or may not be problematic, performing the operation of modifying the ownership data is expected to be a fairly rare event in the program's execution and performance is unlikely to improve by removal of the write fence (508). In most cases, it will be preferred for the implementer to err on the side of caution and leave it in.

Figure 6:
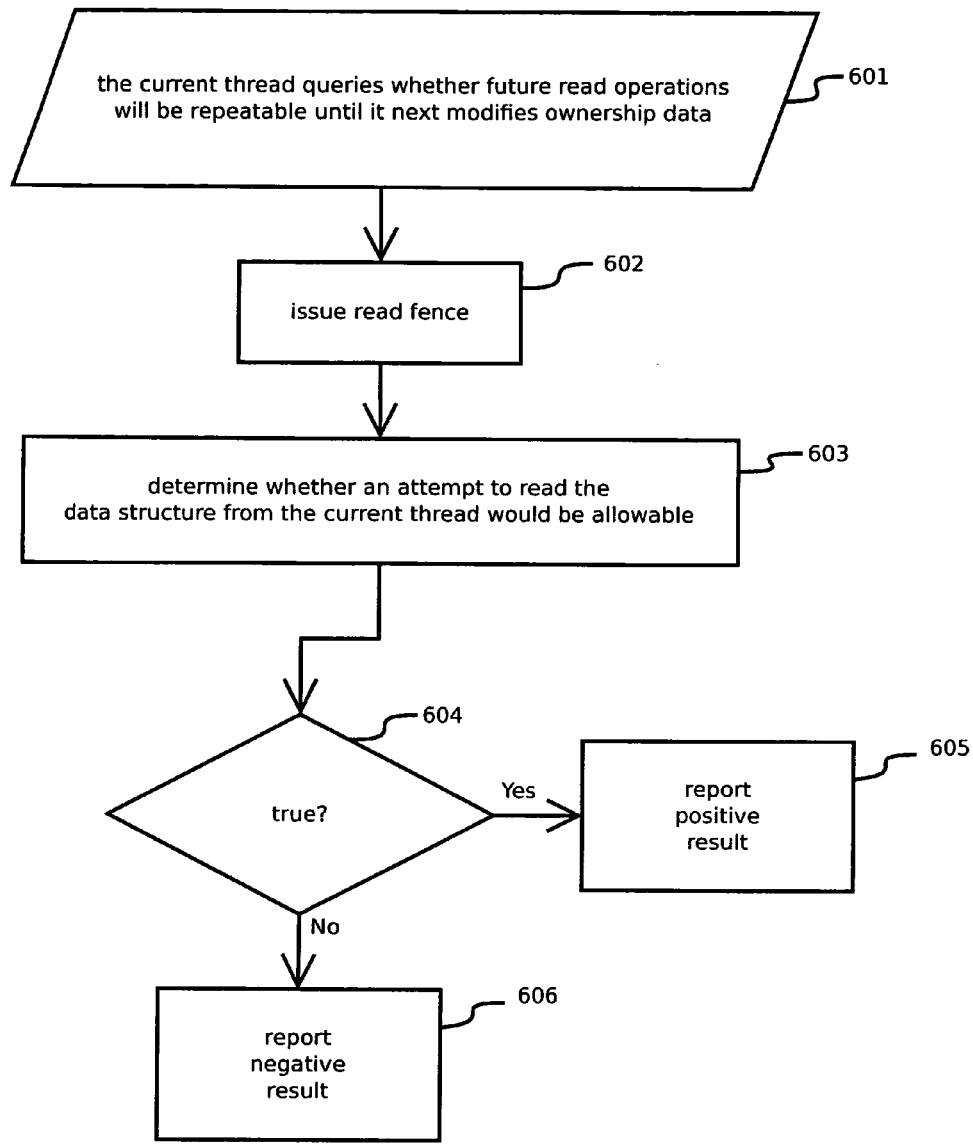
FIG. 6 contains a flowchart detailing a procedure by which it can be determined whether future read operations on the data structure are guaranteed to be repeatable in accordance with the first embodiment.
Figure 7:
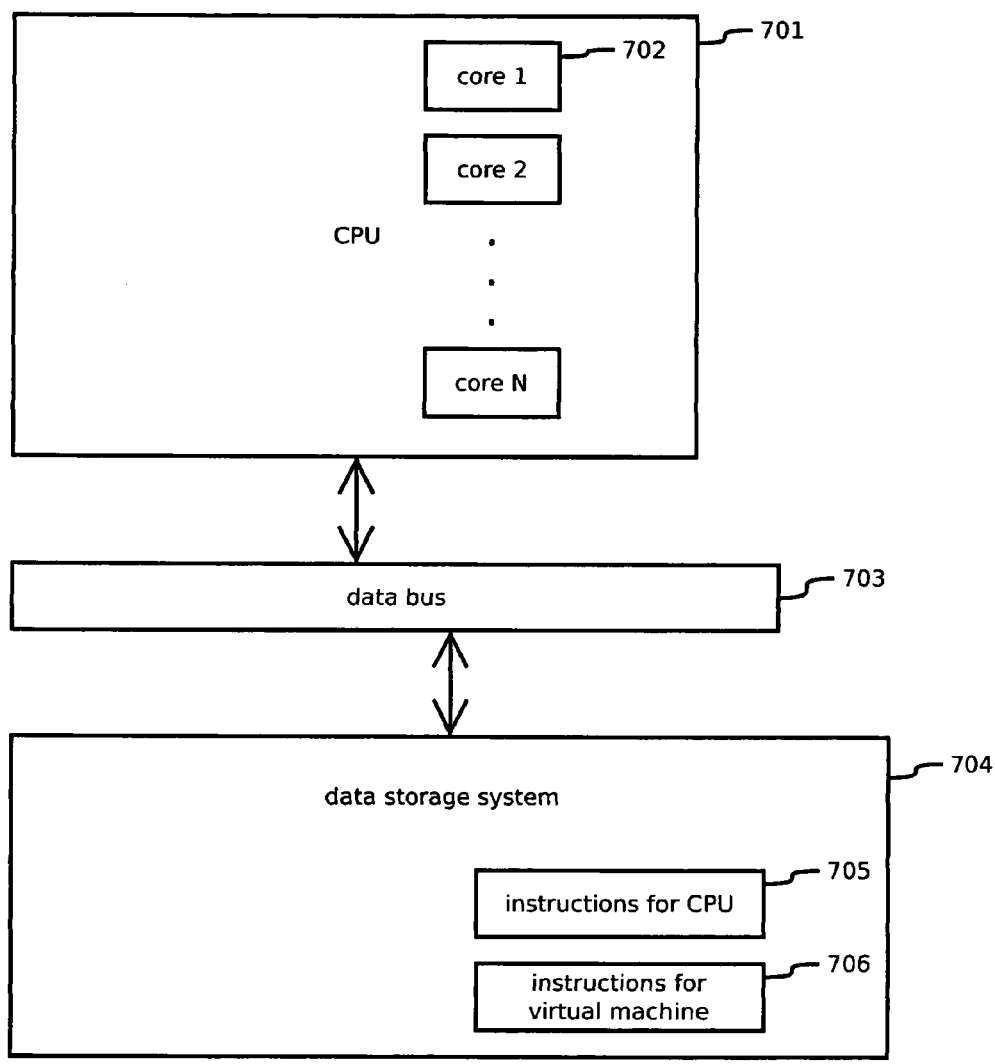
FIG. 7 contains a block diagram detailing the components of an apparatus in accordance with the second embodiment.

In accordance with the first embodiment, a query of whether future read operations on data structure will be repeatable until the next modification of ownership data (FIG. 6) is handled (601) as follows. After issuing a read fence (602), the read access check previously described (102), (103), (104), (105), (106), and (107) is effected to determine if a read operation on the data structure by the current thread would be allowable (603). If the read operation would be allowable (604), a positive result is reported (605). Otherwise, a negative result is reported (606). The purpose of the read fence (602) is analogous to the previously described purpose of the read fence (402) and the same remarks as previously made for the read fence (402) apply to the read fence (602). Note that if this procedure produces a positive result, the "next modification of the ownership data" can only be by the current thread because it either has ownership, or no operable thread has ownership and modification of ownership data is not further possible. Therefore, the guarantee is effective as a guarantee against concurrent modification.

In accordance with the second embodiment, an apparatus comprises a CPU (701), also known as a "central processing unit", having at least one processing core (702), and being communicatively connected, by means of a data bus (703), to a storage system (703) containing instructions for the CPU (705) and instructions for a virtual machine (706). The hardware devices of a CPU, a processing core, a data bus and a storage system are known in the prior art. The storage system includes system memory, for example, DRAM memory, that can be directly accessed by threads without intervention from an operating system (beyond establishing memory frame mappings). The storage system may include a hard disk drive. The storage system may include a logical network drive or network filesystem accessed through a network interface (not shown). System memory, DRAM memory, operating system, memory frame mappings, hard disk drive, network drive and network filesystem are hardware and software devices known in the prior art.

The instructions for the CPU (705) enable the CPU to generate the execution environment of a virtual machine, a method known in the prior art. For example, if instructions for the CPU (705) include the object code of a Java Virtual Machine and the object code of the GNU/Linux operating system, the execution environment of the Java Virtual Machine may be generated by a method known in the prior art. In the second embodiment, the improvement lies in the instructions for the virtual machine (706), which are formulated to implement the method described in the first embodiment for at least one shared data structure whereby the combined system allows achieving the effect of executing a "target program" employing trust domains and/or privilege separation without the possibility of security being compromise through concurrent modification of the shared data. Of course, additional instructions (not shown) representing the target program must be loaded from storage in order to execute the target program in conjunction with the instructions implementing an embodiment of the present invention. Additionally, it should be noted that the target program may not be arbitrary; rather, it must be formulated to access the shared data structure through the interface provided by an embodiment of the present invention.

In accordance with an additional embodiment, the write fence (508) is omitted, leaving only the "critical" write fences (506). This embodiment will work if a separate synchronization mechanism is used to order the reads of one thread as guaranteed to happen after the writes of another thread (for example, if a concurrent queue is used to transfer the data structure between threads in addition to the mechanism described herein). This embodiment may, under rare conditions, not work efficiently if the data structure is shared before being frozen or transferred, and one or more threads use "polling" to determine whether they may access the data structure.

In accordance with a further embodiment, the read check (101) is omitted. This may result in slightly improved performance, with the drawback that security risks are amplified as privileged code may read the data structure at times at which unprivileged threads may be permitted to modify it. The read check alone is not sufficient for guaranteeing read repeatability, because there is no guarantee that a read fence has been effected in the context of the reading thread since the time at which the data structure was last transferred to the reading thread. For secure operation, a read repeatability query is required in any case.

In accordance with an additional embodiment, the functionality that allows the data structure to be placed in the frozen state is omitted. This may allow implementation in execution environments where a distinguished "frozen" value cannot be readily formulated or to save code size where this functionality is not required.

The presently preferred embodiment, or "best mode", includes the first embodiment previously described, complete with all of the previously described and all of the previously described read and write fences, as it is likely that the performance gains from omitting the optional memory fences are minor and it is preferable to provide all features.

Note that the present invention does not directly emulate a reader-writer lock. The operation most nearly analogous to "releasing" a reader-writer lock is modifying the ownership information, but that operation is not generalized to all threads but requires specifying a specific thread to transfer ownership to. In other words, there is no provision for releasing a data structure completely so that it can subsequently be "acquired" and modified by any thread; the present invention requires, at all times, either a unique owner thread or else no modification is permitted at all. However, an effect similar to releasing a reader-writer lock can be achieved by the technique of transferring ownership of a data structure to a "holding" thread and placing the data structure on a concurrent queue destined to the holding thread, and programming the holding thread to accept requests for transferring the data structure to "acquiring" threads, placing the data structure on a concurrent queue destined to the acquiring thread. Fortunately, for most programming situations, this generality is not needed, and the specific thread that must next manipulate the data structure can be readily identified directly specified.

The present invention can be applied to the implementation of a computer program employing a privilege barrier. Supervisor code can, when receiving an encapsulated data structure from an untrusted module, query whether future read operations will be repeatable, and if so, processes the data structure directly, without first making a secure or defensive copy of it, and without first suspending the threads of the untrusted module that generated it.

CONCLUSION, RAMIFICATIONS AND SCOPE

From the description above, a number of advantages of some embodiments become evident, including, most importantly, that a data structure populated with values by the calculations of one thread can be directly used by other threads requiring read repeatability, without first making a secure or defensive copy of the data structure or of its contents. Additionally, mechanisms of some embodiments allow a data structure to be modified by multiple threads (serially rather than concurrently), even if each such thread requires read repeatability until it transfers the data structure to another thread. Additionally, mechanisms of some embodiments allow a data structure to be modified by multiple threads serially before the data structure is "frozen" and subsequently used directly by multiple concurrently-executing threads, each such thread requiring read repeatability, without first making a secure or defensive copy of the data structure or of its contents. These advantages improve run-time program performance, lowering hardware costs and capital outlay for individuals and companies making use of computer programs that utilize the present invention. These advantages additionally reduce the complexity of computer programs that utilize the present invention, lowering development costs for individuals and companies creating computer programs that utilize the present invention.

Although the description above contains many specificities, these should not be construed as limiting the scope of the embodiments but as merely providing illustrations of some the presently preferred embodiments. Since numerous modifications and changes will readily occur to those skilled in the art, it is not desired to limit the invention to the exact construction and operation as illustrated and described. Hence, all suitable modifications and equivalents may be resorted to as falling within the scope of the invention. In the Claims, it is to be understood that the mnemonically numbered threads "first thread," "second thread," "third thread," etc, may each refer to any of the operable threads; they need not necessarily be pairwise distinct.

Program Listing

The following program listing is one specific implementation of a portion of an embodiment previously described. It is only a subset of a complete implementation, and is provided by way of example only, in order to illustrate one possible manner for effecting the storage of ownership data and the corresponding correct placement of read and write fences in accordance with the embodiments previously described. It should be compilable and runnable on any 1.5-compatible Java system.

```
package demo;
public class Demo1
{
    static abstract class ShareableObject
    {
        private Thread owner;
        protected ShareableObject(           )
            {owner=Thread.currentThread( );}
        final boolean canW( )
        {
            if (Thread.currentThread( )==owner) return true;
            return false;
        }
        final boolean canR( )
        {
            if (canW( )) return true;
            if (owner==null) return true;
            return false;
        }
        final void chkW( ) {if (!canW( )) throw null;}
        final void chkR( ) {if (!canR( )) throw null;}
        final void setOwner(Thread peer) {chkW( ); wfence( );
            owner=peer;}
        final void setFrozen( ) {setOwner(null);}
        final boolean isFrozen( ) {rfence( ); return
            (owner==null);}
        final boolean readRepeatable( ) {rfence( ); return
            canR( );}
        private static volatile int v=0;
        private static int s=1;
        final void rfence( ) {s=v;}
        final void wfence( ) {v=s;}
        // read and write fences utilizing a volatile variable may
            each be
        // replaced with the following combined read-write
            fence:
        private final Object target=(new Object( ));
        final void rwfence( ) {synchronized (target) { }}
    }
    static final class Array0
    {
        private int[ ] arr;
        Array0(int len) {arr=(new int[len]);}
        int get(int idx) {return arr[idx];}
        void put(int idx, int val) {arr[idx]=val;}
    }
    static final class ArrayS extends ShareableObject
    {
        private int[ ] arr;
        ArrayS(int len) {arr=(new int[len]);}
        final int get(int idx) {chkR( ); return arr[idx];}
        final void put(int idx, int val) {chkW( ); arr[idx]=val;}
    }
    static void test( ) throws Exception
    {
        final int N=(1<<10);
        final int L=(1<<20);
        int r=1;
        long enter0=System.nanoTime( );
        final Array0 arr0=(new Array0(L));
        for (int j=0; j<N; j++) {
            for (int i=0; i<L; i++) {
                r+=arr0.get(i);
                arr0.put(i, r);
            }
        }
        long leave0=System.nanoTime( );
        final Thread main=Thread.currentThread( );
        final ArrayS arrS=(new ArrayS(L));
        Thread tS=(new Thread( )
            {public void run( ){
                while (!arrS.canW( )) arrS.rfence( ); arrS.setOwner
                    (main);}});
```

```
arrS.setOwner(tS);
tS.start( );
while (!arrS.canW( )) arrS.rfence( );
Thread fS=(new Thread( )
    {public void run( ) {arrS.put(0, 0);}});
fS.start( );
long enterS=System.nanoTime( );
for (int j=0; j<N; j++) {
    for (int i=0; i<L; i++) {
        r+=arrS.get(i);
        arrS.put(i, r);
    }
}
long leaveS=System.nanoTime( );
fS.join( );
System.err.println("0:"+(leave0−enter0));
System.err.println("S:"+(leaveS−enterS));
System.err.println( );
}
public static void main(String[ ] args) throws Exception
{
    // expected output: comparable performance on optimiz-
        ing JVMs and
    // NullPointerExceptions from the threads attempting
        concurrent
    // access
    for (int i=0; i<100; i++) test( );
}
}
```

What is claimed is:

1. A computer-implemented method for detecting and preventing potentially harmful concurrent modification of a data structure accessed by multiple threads, comprising:

(a) providing a memory-safe execution environment, said memory-safe execution environment being generated by a type-safe virtual machine, said type-safe virtual machine having a compiler optimization, said compiler optimization being capable of pulling code out of loops in one or more cases;

(b) configuring said type-safe virtual machine with a cacheable owner thread identifier variable, said cacheable owner thread identifier variable being logically associated with said data structure;

(c) configuring said type-safe virtual machine with an interface, said interface comprising a write function capable of effecting a write operation on said data structure, said write function being formulated to require a write access check before effecting said write operation, said write access check being formulated to determine a first thread identifier, said first thread identifier belonging to a first thread, said first thread having invoked said write function, said write access check being formulated to allow said write operation only if a first cacheable load of said cacheable owner thread identifier variable designates said first thread as currently owning said data structure, said write function being formulated to permit said compiler optimization to pull said write access check out of loops in one or more cases;

(d) a first storing of a second thread identifier to said cacheable owner thread identifier variable, said second thread identifier belonging to a second thread, said second thread preparing said data structure for use;

(e) a first processing of a request to transfer exclusive access to said data structure, said request supplying a supplied thread identifier, said request being made by a third thread, said first processing being performed by said third thread, said first processing including a second storing of said supplied thread identifier in said cacheable owner thread identifier variable, said second storing being performed only if said cacheable owner thread identifier variable designates said third thread as currently owning said data structure, said first processing including issuing a write fence prior to said second storing;

(f) a second processing of a first query of whether reads from said data structure will be repeatable, said first query being made by a fourth thread, said second processing being performed by said fourth thread, said second processing including issuing a first read fence, said second processing including reporting a first positive result only if said cacheable owner thread identifier variable designates said fourth thread as currently owning said data structure or equals a frozen value, said frozen value being distinct from any values that indicate operable threads.

2. The method of claim 1, wherein said interface further comprises a read function capable of effecting a read operation on said data structure, said read function being formulated to require a read access check before effecting said read operation, said read access check being formulated to determine a third thread identifier, said third thread identifier belonging to a fifth thread, said fifth thread having invoked said read function, said read access check being formulated to allow said read operation only if a second cacheable load of said cacheable owner thread identifier variable designates said fifth thread as currently owning said data structure or equals said frozen value, said read function being formulated to permit said compiler optimization to pull said read access check out of loops in one or more cases.

3. The method of claim 2, wherein said data structure is an array, and wherein said interface includes an array read function, said array read function accepting a first array index location, said array read function including said read access check, said array read function being formulated to read said first array index location of said array, and wherein said interface includes an array write function, said array write function accepting a second array index location, said array write function further accepting an array element, said array write function including said write access check, said array write function being formulated to write said array element at said second array index location of said array.

4. The method of claim 3, further comprising a third processing of a second query of whether said data structure is no longer modifiable, said second query being made by a sixth thread, said third processing being performed by said sixth thread, said third processing including issuing a second read fence, said third processing including reporting a second positive result only if said cacheable owner thread identifier variable equals said frozen value.

5. The method of claim 2, further comprising a third processing of a second query of whether said data structure is no longer modifiable, said second query being made by a sixth thread, said third processing being performed by said sixth thread, said third processing including issuing a second read fence, said third processing including reporting a second positive result only if said cacheable owner thread identifier variable equals said frozen value.

6. The method of claim 1, wherein said data structure is an array, and wherein said interface includes an array read function, said array read function accepting a first array index location, said array read function being formulated to read said first array index location of said array, and wherein said interface includes an array write function, said array write function accepting a second array index location, said array write function further accepting an array element, said array write function including said write access check, said array write function being formulated to write said array element at said second array index location of said array.

7. The method of claim 6, further comprising a third processing of a second query of whether said data structure is no longer modifiable, said second query being made by a fifth thread, said third processing being performed by said fifth thread, said third processing including issuing a second read fence, said third processing including reporting a second positive result only if said cacheable owner thread identifier variable equals said frozen value.

8. The method of claim 1, further comprising a third processing of a second query of whether said data structure is no longer modifiable, said second query being made by a fifth thread, said third processing being performed by said fifth thread, said third processing including issuing a second read fence, said third processing including reporting a second positive result only if said cacheable owner thread identifier variable equals said frozen value.

9. An apparatus for detecting and preventing potentially harmful concurrent modification of a data structure accessed by multiple threads, comprising:
(a) a CPU, said CPU having at least one processing core;
(b) a data storage system, said data storage system being communicatively connected to said CPU, said data storage system storing a plurality of instructions, said plurality of instructions configuring said CPU for:
  (1) providing a memory-safe execution environment, said memory-safe execution environment being generated by a type-safe virtual machine, said type-safe virtual machine having a compiler optimization, said compiler optimization being capable of pulling code out of loops in one or more cases;
  (2) configuring said type-safe virtual machine with a cacheable owner thread identifier variable, said cacheable owner thread identifier variable being logically associated with said data structure;
  (3) configuring said type-safe virtual machine with an interface, said interface comprising a write function capable of effecting a write operation on said data structure, said write function being formulated to require a write access check before effecting said write operation, said write access check being formulated to determine a first thread identifier, said first thread identifier belonging to a first thread, said first thread having invoked said write function, said write access check being formulated to allow said write operation only if a first cacheable load of said cacheable owner thread identifier variable designates said first thread as currently owning said data structure, said write function being formulated to permit said compiler optimization to pull said write access check out of loops in one or more cases;
  (4) a first storing of a second thread identifier to said cacheable owner thread identifier variable, said second thread identifier belonging to a second thread, said second thread preparing said data structure for use;
  (5) a first processing of a request to transfer exclusive access to said data structure, said request supplying a supplied thread identifier, said request being made by a third thread, said first processing being performed by said third thread, said first processing including a second storing of said supplied thread identifier in said cacheable owner thread identifier variable, said second storing being performed only if said cacheable owner thread identifier variable designates said third thread as currently owning said data structure, said first processing including issuing a write fence prior to said second storing;
  (6) a second processing of a query of whether reads from said data structure will be repeatable, said query being made by a fourth thread, said second processing being performed by said fourth thread, said second processing including issuing a read fence, said second processing including reporting a positive result only if said cacheable owner thread identifier variable designates said fourth thread as currently owning said data structure or equals a frozen value, said frozen value being distinct from any values that indicate operable threads.

10. The apparatus of claim 9, wherein said interface further comprises a read function capable of effecting a read operation on said data structure, said read function being formulated to require a read access check before effecting said read operation, said read access check being formulated to determine a third thread identifier, said third thread identifier belonging to a fifth thread, said fifth thread having invoked said read function, said read access check being formulated to allow said read operation only if a second cacheable load of said cacheable owner thread identifier variable designates said fifth thread as currently owning said data structure or equals said frozen value, said read function being formulated to permit said compiler optimization to pull said read access check out of loops in one or more cases.

* * * * *